(12) United States Patent
Engels et al.

(10) Patent No.: US 11,367,545 B2
(45) Date of Patent: Jun. 21, 2022

(54) PLUGGABLE HIGH-VOLTAGE BUSHING AND ELECTRICAL DEVICE HAVING THE PLUGGABLE HIGH-VOLTAGE BUSHING

(71) Applicant: Siemens Energy Global GmbH & Co. KG, Munich (DE)

(72) Inventors: Engelbert Engels, Cologne (DE); Achim Langens, Lohmar (DE); Tim Schnitzler, Kreuzau (DE); Joachim Titze, Ratingen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 44 days.

(21) Appl. No.: 16/965,103

(22) PCT Filed: Jan. 8, 2019

(86) PCT No.: PCT/EP2019/050295
§ 371 (c)(1),
(2) Date: Jul. 27, 2020

(87) PCT Pub. No.: WO2019/145139
PCT Pub. Date: Aug. 1, 2019

(65) Prior Publication Data
US 2021/0366632 A1 Nov. 25, 2021

(30) Foreign Application Priority Data
Jan. 26, 2018 (DE) .......................... 102018201224.5

(51) Int. Cl.
*H01B 17/28* (2006.01)
*H01F 27/04* (2006.01)
*H02G 15/072* (2006.01)

(52) U.S. Cl.
CPC ............. *H01B 17/28* (2013.01); *H01F 27/04* (2013.01); *H02G 15/072* (2013.01)

(58) Field of Classification Search
CPC ....... H01F 27/04; H01F 27/02; H01B 17/265; H01B 17/301; H01B 17/26; H01B 17/00;
(Continued)

(56) References Cited

U.S. PATENT DOCUMENTS 3,942,099 A    3/1976  Freygang et al.
6,150,613 A   11/2000  Bergstrom
(Continued)

FOREIGN PATENT DOCUMENTS

DE    102007022641 A1    11/2008
DE    102015226472 A1     6/2017
(Continued)

OTHER PUBLICATIONS

PCT International Search Report and Written Opinion of International Searching Authority dated Mar. 15, 2019 corresponding to PCT International Application No. PCT/EP2019/050295 filed Jan. 8, 2019.

*Primary Examiner* — Angel R Estrada
(74) *Attorney, Agent, or Firm* — Laurence A. Greenberg; Werner H. Stemer; Ralph E. Locher

(57) ABSTRACT

A pluggable high-voltage feed-through has an inner conductor, which extends in a longitudinal direction between a high-voltage connection and a plug-in section of the high-voltage feed-though. The plug-in section is configured for plugging the high-voltage feed-though into a device connection part of an electrical device. An insulating body surrounds the inner conductor. A test tapping point is provided with an electrical contact for connecting to a connection of a measuring device. The test tapping point is arranged outside the plug-in section. An electrical device has a fluid-tight housing and the high-voltage feed-through. A device connection part is provided for receiving and contacting the high-voltage feed-through.

11 Claims, 2 Drawing Sheets

(58) Field of Classification Search
CPC .......... H01B 19/00; H01B 17/56; H01B 7/00;
H01B 17/30; H01B 17/28; H01R 13/53;
H01R 4/70; H05K 5/03; H01H 9/02;
H01H 9/0264; H01H 85/185; H02G
15/072; H01G 4/32
USPC ......... 174/142, 152 G, 153 G, 152 R, 138 R,
174/139, 138 F, 137 R, 5 R, 14 BH, 143;
16/2.1, 2.2
See application file for complete search history.

(56) References Cited

U.S. PATENT DOCUMENTS

| | | | |
|---|---|---|---|
| 8,455,763 B2 * | 6/2013 | Dais | H01B 17/28 |
| | | | 174/152 R |
| 8,969,729 B2 * | 3/2015 | Jahnel | H01B 3/52 |
| | | | 174/142 |
| 9,947,442 B2 | 4/2018 | Engels et al. | |
| 10,468,162 B2 * | 11/2019 | Ma | H01B 17/34 |
| 2008/0001694 A1 | 1/2008 | Wang | |
| 2009/0288878 A1 | 11/2009 | Rocks et al. | |
| 2012/0071014 A1 | 3/2012 | Dais et al. | |
| 2017/0287601 A1 | 10/2017 | Engels et al. | |
| 2017/0316862 A1 | 11/2017 | Ettl | |

FOREIGN PATENT DOCUMENTS

| | | |
|---|---|---|
| EP | 1816660 A1 | 8/2007 |
| EP | 2093777 A1 | 8/2009 |
| EP | 3185251 A1 | 6/2017 |
| EP | 3229242 A1 | 10/2017 |
| JP | H08306254 A | 11/1996 |
| JP | H11273478 A | 10/1999 |

* cited by examiner

PLUGGABLE HIGH-VOLTAGE BUSHING AND ELECTRICAL DEVICE HAVING THE PLUGGABLE HIGH-VOLTAGE BUSHING

BACKGROUND OF THE INVENTION

Field of the Invention

The invention relates to a pluggable high-voltage bushing comprising an inner conductor extending in a longitudinal direction between a high-voltage connection and a plug-in portion of the high-voltage bushing, wherein the plug-in portion is configured for plugging the high-voltage bushing into a device connection part of an electrical device, and comprising an insulating body enclosing the inner conductor.

In general, such a high-voltage bushing has the task of insulating a high-voltage line having a current-carrying current conductor, said high-voltage line being at high-voltage potential, from an environment that is substantially at ground potential, for example a wall of the high-voltage installation. In this case, the inner conductor of the high-voltage bushing forms a part of the current conductor or is inserted into the latter.

A high-voltage bushing of the type mentioned in the introduction is known from DE 10 2007 022 641 A1, which discloses a transformer, the housing of which has a device connection part, into which a high-voltage bushing for connecting the transformer to a high-voltage power supply system is pluggable. The use of a pluggable high-voltage bushing of this type makes it possible to construct and commission the transformer with the high-voltage bushing with as little assembly outlay as possible.

The plug-in portion of the high-voltage bushing and the device connection part are configured in such a way that it is possible to produce a reliable electrical contact between the inner conductor of the high-voltage bushing and the device connection part, wherein the device connection part is electrically connected to further elements of the electrical device, such as, for example, an active part arranged inside the housing. At the same time, the connection at the contact surfaces between the device connection part and the plug-in portion is dielectrically strengthened to a sufficient extent, thereby enabling operation at a high-voltage level. In order to produce the insulating body, insulating layers composed of paper are usually wound around the inner conductor.

SUMMARY OF THE INVENTION

The object of the invention is to further improve the pluggable high-voltage bushing of the type mentioned in the introduction.

In the case of a high-voltage bushing of the generic type, the object is achieved according to the invention by virtue of the fact that provision is made of a test tap with an electrical contact means for connecting to a connection of a measuring device, wherein the test tap is arranged outside the plug-in portion. Since the plug-in portion is usually plugged into a receptacle of the device connection part during operation of the high-voltage bushing, care must be taken to ensure that the test tap is situated outside the plug-in portion. By way of example, the test tap can be arranged axially above the plug-in region, i.e. further in the direction of the high-voltage connection situated opposite the plug-in portion. The plug-in portion expediently has an outer coating composed of a flexible insulating coating material. The outer coating can extend for example onto a part of the outer surface of the plug-in portion, preferably onto that part which is in contact with the high-voltage bushing upon the latter being plugged into the device connection part. The coating allows a particularly good dielectric strengthening of the joint that arises during plugging in. The coating preferably comprises silicone.

One advantage of the pluggable high-voltage bushing according to the invention is that during the operation of the high-voltage bushing, by means of the test tap, it is possible to provide a test voltage for the measuring device. A state of the high-voltage bushing can be deduced from the test voltage by means of the measuring device. This can be used for monitoring the high-voltage bushing.

Preferably, a measurement connection line of the contact means is led out of the high-voltage bushing in an insulated fashion. For example, the contact means is arranged in a measurement connection cutout of the high-voltage bushing, wherein the measurement connection cutout with the contact means arranged therein is filled with an insulating material. The measurement connection cutout is typically a hole having a diameter of approximately 10 mm to 50 mm that is introduced into an outer housing of the high-voltage bushing. The region between the contact means and the measurement connection cutout is potted with an insulating material. This is an advantage because the electrical insulation of the contact means is ensured in this way in a simple manner and without further aids such as protective gas, for example. Particularly preferably, the insulating material at least proportionally comprises silicone. This is an advantage because silicone has the necessary electrical breakdown strength, is cost-effective and has long endurance. Preferably, the voltage divider tapping is suitable for a test voltage of 20 kV. This is an advantage because it is thus possible to test the high-voltage bushing in accordance with the standard IEEE STD C57.19.01-2000, thereby ensuring interoperability with products from numerous manufacturers.

In accordance with one embodiment of the invention, the high-voltage bushing is controlled capacitively. To that end, the insulating body of the high-voltage bushing comprises field-controlling control inserts separated from one another by insulating layers, wherein the contact means comprises a measurement connection line, which is electrically connected to one of the control inserts. The control inserts can consist of aluminum foils, for example. The insulating layers can be composed for example of paper or plastic, for example a synthetic, textile sheetlike structure, such as nonwoven material. A radial thickness of the insulating layers can be between 0.1 cm and 0.5 cm. One advantage of field control is the controlled and relatively uniform profile of the electric field in and on the high-voltage bushing, which improves the insulating properties of the high-voltage bushing. The contact means is connected to one of the control inserts. The potential at the control insert connected to the contact means is tapped off in this way. Advantageously, in this case the contact means does not have to mechanically engage deeply into the insulating body. Particularly if the contact means is connected to one of the outer control inserts, for example to the outermost control insert. An impairment of the insulating properties of the high-voltage bushing can be avoided in this way. The contact means can for example be soldered to the control insert. In this way, a test tap is provided which is readily accessible from an exterior of the high-voltage bushing and has a connection or measurement connection line insulated from the securing flange, which is usually grounded. Thus, measurements of a loss factor, capacitance and/or partial discharge can advantageously be carried out.

In accordance with one embodiment of the invention, the contact means or the measurement connection line is electrically connected to a second outermost control insert. In this case, the second outermost control insert is understood to be that control insert which is arranged at the second largest radial distance from the inner conductor. In this case, the contact means reaches through an interruption in the outermost control insert and contacts the second outermost control insert. In this case, the outermost control insert can be brought electrically to the potential level of the outer housing of the high-voltage bushing (and thus grounded) by being electrically connected to the outer housing. A voltage divider tapping is provided in this way. In particular, the entire potential difference between the inner conductor of the high-voltage bushing and the ground potential is divided, such that only a smaller partial voltage is tapped off. This makes it possible to use measuring devices designed for relatively small input voltages. In this case, the measured voltages are determined from the capacitances in the system, in particular from a main capacitance and a tapping capacitance. The main capacitance is the capacitance between the inner conductor and the connected control insert, and the tapping capacitance is the capacitance between the test tap and the grounded control insert. These capacitances are accurately determinable and therefore allow particularly more accurate measurements. This is an advantage vis-à-vis other test taps where, for example, the high-voltage connection is measured directly by means of an additional high-voltage measuring device or the outermost control insert is tapped. In the latter embodiment, specifically, virtually indeterminable environment-dependent capacitances also influence the measurements.

In accordance with one embodiment of the invention, the voltage divider tapping comprises an auxiliary bushing, which guides the measurement connection line of the contact means through an outer housing of the high-voltage bushing in an insulated fashion. This makes it possible to avoid electrical flashovers between the measurement connection line inside the housing and the housing or other parts of the high-voltage bushing to which voltage is applied.

Preferably, the test tap comprises a grounding device for grounding the contact means. The voltage divider tapping can be grounded by means of the grounding device. To that end, for example, the contact means or the measurement connection line can be electrically connectable to a component of the high-voltage bushing that is at ground potential. Overvoltages that could result in discharge and damage of the test tap and of the entire high-voltage bushing can advantageously be avoided by means of the grounding. This is relevant particularly while the test tap is not being used for voltage measurement (is not activated). The grounding can be realized for example by a contact device in a closure cap. This could comprise a resilient pin or a contact spring, for example. Moreover, the grounding can be fixedly installed in the test tap and be interruptible only upon insertion of an insulated plug for a measurement.

Preferably, the control inserts are arranged concentrically around the inner conductor and extend into the plug-in portion. Accordingly, apart from manufacturing tolerances, the control inserts are arranged concentrically around the inner conductor. In cross section the control inserts thus form suitably concentric or almost concentric circles or almost circles, which need not be totally closed, however. In this case, the field-controlling, in particular capacitive, control inserts serve for the capacitive field control of the electric field of the high-voltage bushing during operation thereof. The control inserts extend into the plug-in portion of the high-voltage bushing. In this way, it is possible to effectively control the electric field in the plug-in portion, too, such that the sensitive region of the connection between the device connection part and the high-voltage bushing has improved electrical properties. Insulating layers composed of the nonwoven material are regarded as particularly suitable. Some investigations have revealed that with the use of the insulating layers comprising the nonwoven material, the control inserts have more uniform surfaces than with the corresponding use of paper. Uniform surfaces of the control inserts result in improved field control on account of reduced field boosting at the control inserts. Therefore, this results in a further improvement of the electrical properties of the high-voltage bushing. This advantage is of particular significance in the case of the pluggable high-voltage bushing because uniform field control in the plug-in portion of the high-voltage bushing is particularly important in order to provide the required dielectric strength in this limited structural space.

The insulating body preferably comprises a cured resin. By way of example, the high-voltage bushing can be impregnated with a curable resin during the production process, for example after the insulating layers have been wound on. An insulating body that is insulated in an improved manner can thus be obtained after the resin has been cured. In this case, the insulating body is present in the form of a compact block, such that a main insulation with a gas can be dispensed with.

Expediently, the high-voltage bushing furthermore comprises a securing flange for securing the high-voltage bushing to a housing of the electrical device.

The invention furthermore relates to an electrical device comprising a fluid-tight housing and a high-voltage bushing, wherein provision is made of a device connection part for receiving and contacting the high-voltage bushing.

Such a device is known from DE 10 2007 022 641 A1, already cited above.

The object of the invention is to provide such a device which is as reliable as possible during operation.

In the case of an electrical device of the generic type, the object is achieved by virtue of the fact that the high-voltage bushing is a high-voltage bushing according to the invention.

The advantages of the electrical device according to the invention are evident in particular from the above-described advantages of the high-voltage bushing according to the invention.

Preferably, the device connection part is secured to the housing by means of a securing portion, from which a hollow receiving portion composed of an electrically non-conductive insulating material extends into the housing, wherein a metallic contact part is arranged at a closed tapered end region, said contact part extending through the insulating material of the receiving portion or lengthening the latter toward the closed end region. In accordance with this embodiment of the invention, each device connection part has an open end approximately at the level of a housing cover of the housing of the electrical device, which enables the plug-in portion of the high-voltage bushing to be plugged in. In the plug-in direction, from the securing portion of the device connection part a receiving portion extends into the interior of the housing, wherein the receiving portion is produced from an insulating material that provides the necessary insulation between the contact piece, which is at a high-voltage potential during operation, and the housing of the electrical device, for example of a transformer, which is at a ground potential. In order to provide the required dielectric strength here, the receiving portion and the plug-in portion are embodied with complementary shapes with respect to one another, such that on account of the high-voltage bushing's own weight, the plug-in portion is pressed fixedly against the inner wall of the receiving portion in order in this way to avoid voltage spikes between high-voltage bushing and device connection part.

Preferably, the contact part is connected to a winding, for example a transformer winding of a transformer, via a winding connection line extending inside the housing. As a result of the high-voltage bushing being plugged into the device connection part, the inner conductor of the high-voltage bushing bears against the contact part, such that the high-voltage connection of the high-voltage bushing is connected to the winding of the electrical device via the winding connection line.

In accordance with a further embodiment of the invention, the winding connection line is equipped with a current sensor, for example a current converter. By virtue of the fact that the current sensor is arranged inside the housing, the current sensor no longer has to be integrated into the line strand on site in a complicated manner during the assembly of the electrical device. In other words, the electrical device according to the invention can be rapidly commissioned on site. Complicated mounting of the current sensor is avoided in the case of this embodiment. Mounting openings are expediently provided in the housing in order to enable access to the current sensor(s) after the insulating liquid has been drained.

The invention will be explained in further detail below with reference to FIGS. 1 and 2.

DETAILED DESCRIPTION OF THE INVENTION

Figure 1:
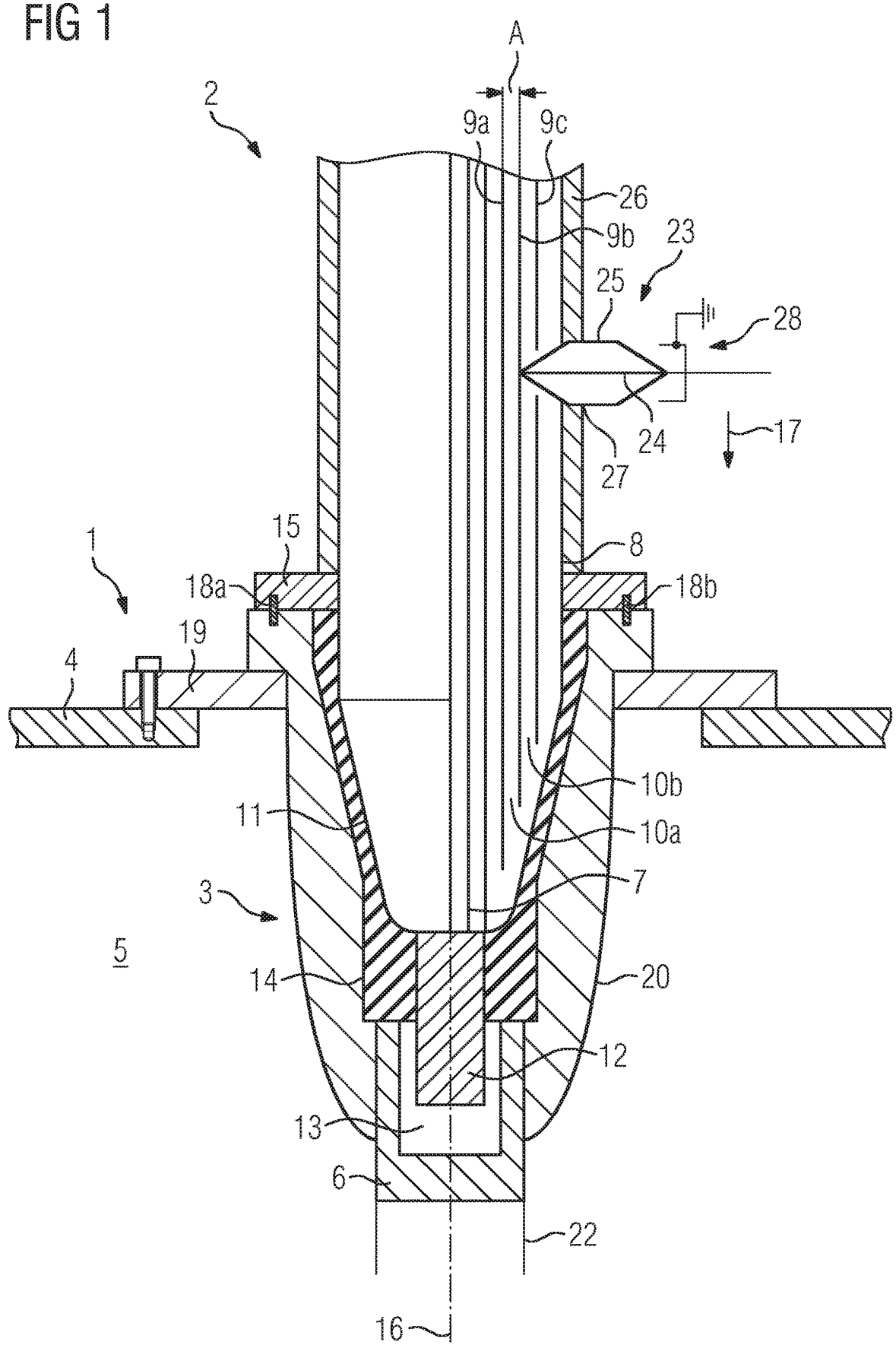
FIG. 1 shows one exemplary embodiment of an electrical device according to the invention comprising a high-voltage bushing according to the invention in a schematic partial cross-sectional view.

FIG. 1 illustrates a partial excerpt from an electrical device in the form of a transformer 1 comprising a pluggable high-voltage bushing 2 and a device connection part 3 for receiving and contacting the high-voltage bushing 2. In the illustration in the figure, the high-voltage bushing 2 is plugged into the device connection part 3 of the transformer 1. The device connection part 3 is secured to a housing wall 4. The housing wall 4 delimits an interior 5 of a transformer housing of the transformer 1, said housing being filled with an insulating medium, for example insulating oil. The securing of the high-voltage bushing 2 to the housing wall 4 is embodied in an insulating-medium-tight fashion, such that the insulating medium cannot escape from the housing. The device connection part 3 comprises a conductive connection part 6 for establishing an electrical connection between the high-voltage bushing 2 and a transformer winding (not illustrated in the figures) of the transformer 1, said winding being arranged inside the housing filled with insulating oil.

The high-voltage bushing 2 comprises an inner conductor 7, which is embodied as a hollow conductor composed of aluminum or copper in the example illustrated. The inner conductor 7 is surrounded concentrically by an insulating body 8. The insulating body 8 comprises conductive control inserts 9a-c for capacitive field control, which are arranged concentrically around the inner conductor 7. The control inserts 9a-c are separated from one another by insulating layers 10a-b composed of a PET nonwoven material, which insulating layers have been impregnated in resin after being wound onto the inner conductor 7. The control inserts 9a-c are arranged at a radial distance A of 2 mm from one another.

The high-voltage bushing 2 furthermore comprises a plug-in portion 11 for plugging the high-voltage bushing 2 into the device connection part 3. The plug-in portion 11 comprises a conically tapering part of the insulating body 8 and also a connection conductor portion welded to the inner conductor 7 in the form of a conductor bolt 12. Adjacent to the conductor bolt 12 is a contact system 13, which establishes the electrical connection between the high-voltage bushing 2 and the connection part 6.

An interspace 14 between the plug-in portion 11 of the high-voltage bushing 2 and the device connection part 3 is filled with a silicone material, which dielectrically strengthens the interspace 14.

The high-voltage bushing 2 furthermore comprises a securing flange 15 for securing the high-voltage bushing 2 to the device connection part 3.

In order to produce the electrical device 1, the high-voltage bushing 2 is inserted into the device connection part 3, specifically along a longitudinal axis 16 of the high-voltage bushing 2 and in the direction indicated by an arrow 17 in the figure. Afterward, the securing flange 15 can be mechanically connected to the device connection part 3 with the aid of securing elements 18a,b.

It is evident that the device connection part 3 has a securing portion 19, by which said device connection part is fixedly mounted on the housing wall 4. This is done using suitable screw connections, for example. In order to secure the device connection part 3 to the housing wall 4 in an insulating-medium-tight fashion, sealants (not illustrated in the figures) are provided.

The device connection part 3 furthermore has a receiving portion 20 consisting of an electrically nonconductive material. In this case, the receiving portion 20 tapers toward a closed end. At the closed end, the bolt-type connection or contact part 6 projects through the wall of the receiving portion 20. At its portion projecting into the interior 5 or oil space of the housing, the contact part 6 is connected to a winding connection line 22. The winding connection line 22 is furthermore equipped with a current sensor in the form of a current converter (not illustrated in the figures). The current converter is thus fixedly installed in the housing and serves for detecting an electric current flowing to or from the respective winding via the winding connection line 22.

The plug-in portion 11 of the high-voltage bushing 2 extends from the securing flange 15 into the receiving portion 20 of the device connection part 3. In this case, the plug-in portion 11 has a complementary shape with respect to the receiving portion 20, such that the two components bear against one another with an accurate fit and air or other inclusions can be avoided.

The high-voltage bushing 2 furthermore comprises a voltage divider tapping 23 with an electrical contact means 24 for connecting to a connection of a measuring device (not illustrated graphically) for measuring the electrical voltage at the high-voltage bushing 2. The contact means comprises a measurement connection line 24. The voltage divider tapping 23 is arranged above the securing flange 15 and thus also outside the plug-in portion 11 of the high-voltage bushing 2. The measurement connection line 24 is electrically connected to the second outermost control insert 9b. The measurement connection line 24 is guided toward the outside through a cutout in the outermost control insert 9c. An outer housing 26 of the high-voltage bushing 2 has a measurement connection cutout 27. The measurement connection line 24 is guided through the measurement connection cutout 27. The measurement connection cutout 27 with the contact means 24 arranged therein is filled with an insulating material.

The voltage divider tapping 23 comprises an auxiliary bushing 25, by means of which the measurement connection line 24 is guided through the housing 26 of the high-voltage bushing 2 in an insulated manner. Moreover, a grounding device 28 is provided. The voltage divider tapping 23 can be grounded by means of the grounding device 28. The grounding device 28 comprises a closure cap with a contact spring, which contacts the measurement connection line 24 for the purpose of grounding the voltage divider tapping 23. In the normal operating state of the high-voltage bushing, the voltage divider tapping expediently remains connected to the measurement technology or grounded.

Figure 2:
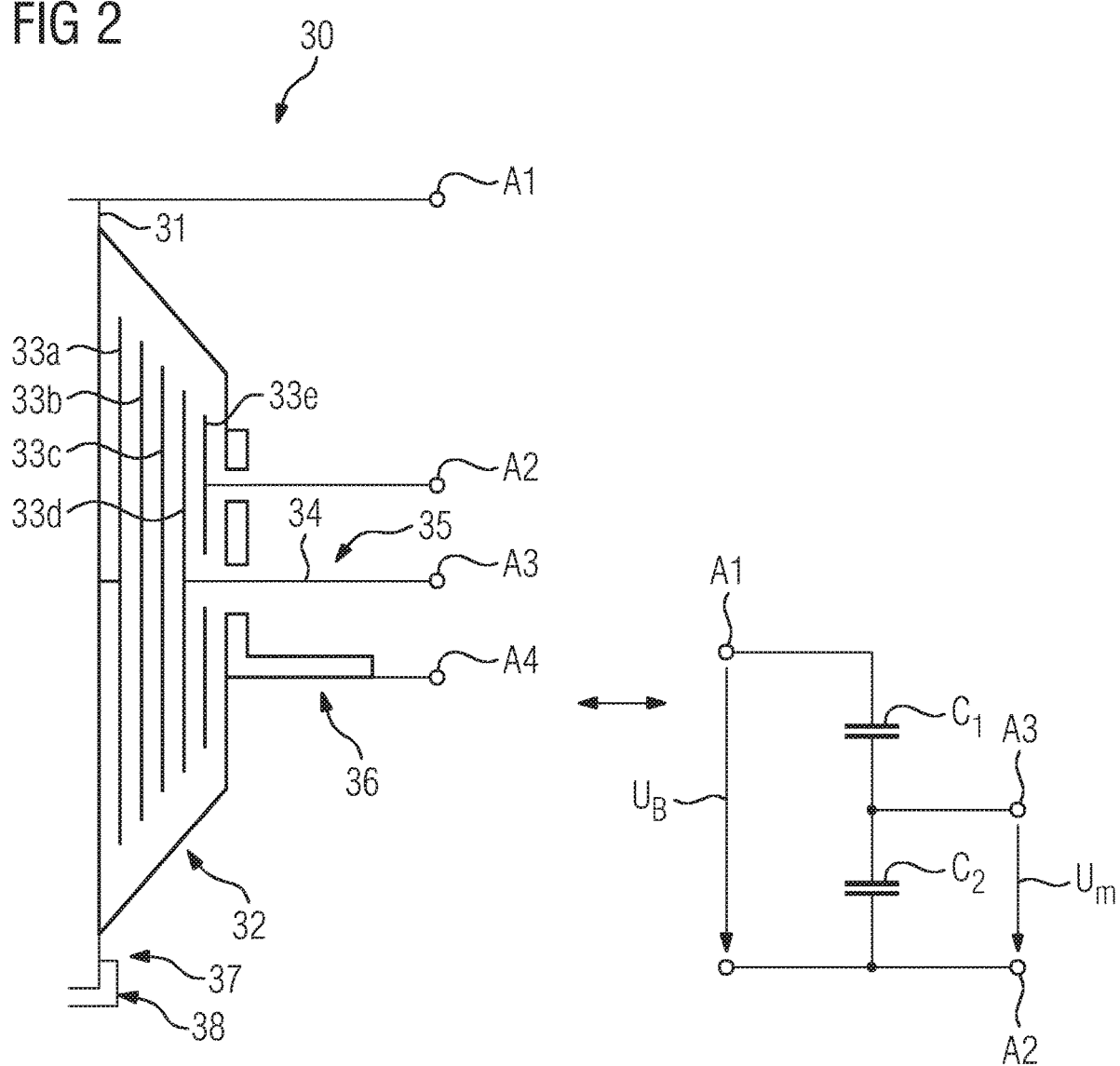
FIG. 2 shows a basic schematic diagram of a high-voltage bushing according to the invention comprising a test tap in the form of a voltage divider tapping.

FIG. 2 shows a high-voltage bushing 30 on the left-hand side and the counterpart of said high-voltage bushing in an equivalent circuit diagram on the right-hand side. The high-voltage bushing 30 comprises an inner conductor 31. An insulating body 32 is arranged around the inner conductor 31. The insulating body 32 is composed of an insulating material, such as paper or nonwoven material, for example, which was impregnated with a resin. The insulating body 32 furthermore comprises field-controlling control inserts 33a-e composed of electrically conductive material, such as aluminum, for example. The innermost control insert 33a is electrically connected to the inner conductor 31. The second outermost control insert 33e is connected to a measurement connection line 34 of a voltage divider tapping 35. The measurement connection line 34 is guided through the outermost control insert 33e and a securing flange 36 in an insulated manner.

The high-voltage bushing 30 additionally comprises a plug-in portion 37 with a contact system 38 in a corresponding manner to the high-voltage bushing 2 in FIG. 1.

The following potential points are depicted in the schematic diagram in FIG. 2: A1 is a potential point at the high-voltage conductor 1, A2 is a potential point at the outermost control insert 33e, A3 is a potential point at the second outermost control insert 33d, and A4 is a potential point at the securing flange 36.

The equivalent circuit diagram on the right-hand side of FIG. 2 illustrates the calculation of the voltage UB between the potential points A1 and A2 from a tapped off voltage between the potential points A3 and A2 and also the main capacitance C1 and the tapping capacitance C2. The voltage is determined in accordance with the equation UB=Um*(C1+C2)/C1. The potential point A3 is insulated from surrounding fields. Consequently, the voltage measurement is largely uninfluenced by external stray capacitances. The capacitances C1 and C2 are additionally known relatively accurately, such that the construction of the voltage divider tapping allows a good measurement accuracy.

The invention claimed is:

1. A pluggable high-voltage bushing, comprising:
    a plug-in portion configured for plugging the high-voltage bushing into a device connection part of an electrical device;
    an inner conductor extending longitudinally between a high-voltage connection and said plug-in portion of the high-voltage bushing;
    an insulating body enclosing said inner conductor, said insulating body having field-controlling control inserts arranged concentrically around said inner conductor and insulating layers separating said control inserts from one another; and
    a test tap with an electrical contact for connecting to a connection of a measuring device, said test tap being arranged outside said plug-in portion and having a measurement connection line electrically connected to a second outermost control insert, with said test tap forming a voltage divider tapping having connections to a potential of said inner conductor, to a potential of an outermost control insert, and to a potential of said second outermost control insert via said measurement connection line.

2. The high-voltage bushing according to claim 1, wherein said measurement connection line of said voltage divider tapping is enclosed in an insulation.

3. The high-voltage bushing according to claim 1, wherein said voltage divider tapping comprises an auxiliary bushing disposed to insulate and guide said measurement connection line of said contact through an outer housing of the high-voltage bushing.

4. The high-voltage bushing according to claim 1, wherein said test tap includes a grounding device for grounding said contact.

5. The high-voltage bushing according to claim 1, wherein said insulating body comprises a cured resin.

6. The high-voltage bushing according to claim 1, further comprising a securing flange for securing the high-voltage bushing to a housing of the electrical device.

7. An electrical device, comprising:
    a fluid-tight housing;
    a high-voltage bushing according to claim 1; and
    a device connection part for receiving and contacting said high-voltage bushing.

8. The electrical device according to claim 7, further comprising a securing portion for securing said device connection part to said housing, a hollow receiving portion composed of an electrically nonconductive insulating material extending from said securing portion into said housing, and a metallic contact part arranged at a closed tapered end region, said contact part extending through said insulating material of said receiving portion or lengthening said receiving portion toward said closed tapered end region.

9. The electrical device according to claim 8, wherein said contact part is connected to a winding via a winding connection line extending inside said housing.

10. The electrical device according to claim 9, wherein said winding connection line is equipped with a current sensor.

11. The high-voltage bushing according to claim 1, wherein said connections to the potentials of the inner conductor, the outermost control insert, and the second outermost control insert enable a measurement of a voltage between the inner conductor and the outermost control insert.

* * * * *